United States Patent
Kubo et al.

(10) Patent No.: US 12,442,421 B2
(45) Date of Patent: Oct. 14, 2025

(54) CONSTANT-SPEED UNIVERSAL JOINT

(71) Applicant: JTEKT CORPORATION, Kariya (JP)

(72) Inventors: Koji Kubo, Kariya (JP); Yuya Kudo, Handa (JP); Masahito Ikeo, Anjo (JP); Yoshitaka Shinoda, Nagakute (JP); Susumu Abe, Toyota (JP)

(73) Assignee: JTEKT CORPORATION, Kariya (JP)

( * ) Notice: Subject to any disclaimer, the term of this patent is extended or adjusted under 35 U.S.C. 154(b) by 363 days.

(21) Appl. No.: 18/063,299

(22) Filed: Dec. 8, 2022

(65) Prior Publication Data

US 2023/0184297 A1 Jun. 15, 2023

(30) Foreign Application Priority Data

Dec. 9, 2021 (JP) ................................ 2021-200276

(51) Int. Cl.
*F16D 3/223* (2011.01)
*F16D 3/2237* (2011.01)

(52) U.S. Cl.
CPC .. *F16D 3/2237* (2013.01); *F16D 2003/22306* (2013.01); *F16D 2003/22309* (2013.01); *F16D 2003/22313* (2013.01); *Y10S 464/906* (2013.01)

(58) Field of Classification Search
CPC ......... F16D 3/2237; F16D 2003/22306; F16D 2003/22309; F16D 2003/22313; Y10S 464/906
USPC ....................................................... 464/145
See application file for complete search history.

(56) References Cited

U.S. PATENT DOCUMENTS

| | | | | |
|---|---|---|---|---|
| 6,190,262 B1* | 2/2001 | Miyazaki | ................ | F16D 3/223 464/145 |
| 6,910,970 B2* | 6/2005 | Kobayashi | .............. | F16D 3/223 464/145 |
| 8,684,850 B2* | 4/2014 | Terasaka | ............... | F16D 3/2237 464/145 |

FOREIGN PATENT DOCUMENTS

| | | |
|---|---|---|
| JP | 8-42585 A | 2/1996 |
| JP | 2012-072865 A | 4/2012 |

OTHER PUBLICATIONS

Universal Joint and Driveshaft Design Manual, AE-7, Chapter 3 Introduction, Society of Automotive Engineers, Inc., Warrendale, PA, p. 35, TJ1079.S62. (Year: 1979).*

(Continued)

*Primary Examiner* — Greg Binda
(74) *Attorney, Agent, or Firm* — Oblon, McClelland, Maier & Neustadt, L.L.P.

(57) ABSTRACT

A constant-velocity universal joint includes: an outer ring; an inner ring; a plurality of balls that engages with the outer-ring ball grooves and the inner-ring ball, grooves; and a holder that is interposed between an inner spherical surface of the outer ring and an outer spherical surface of the inner ring and in which a holding window for holding the plurality of balls is formed. A chamfered portion is formed in the inner ring. The chamfered portion includes a linear section portion that is formed in a linear shape in a section perpendicular to a moving locus of the center of the corresponding ball and an arc section portion that is formed in a protruding arc shape in the section perpendicular to the moving locus of the center of the corresponding ball.

11 Claims, 5 Drawing Sheets

(56) References Cited

OTHER PUBLICATIONS

Japanese Office Action issued in Japanese Patent Application No. 2021-200276 on Jul. 22, 2025, (with partial English Translation).

\* cited by examiner

← CUP BOTTOM SIDE    CUP OPENING SIDE →

CONSTANT-SPEED UNIVERSAL JOINT

CROSS-REFERENCE TO RELATED APPLICATION

This application claims priority to Japanese Patent Application No. 2021-200276 filed on Dec. 9, 2021, incorporated herein by reference in its entirety.

BACKGROUND

1. Technical Field

The disclosure relates to a constant-velocityconstant-velocity universal joint.

2. Description of Related. Art

In a constant-velocityconstant-velocity universal joint of a joint center fixed type, when a torque is transmitted between an inner ring and an outer ring via a ball, a large load is applied to the vicinity of an edge of an inner-ring ball groove from the ball. When a load is applied to the vicinity of an edge of the inner-ring ball groove from the ball, a boundary part between the inner-ring ball groove and an outer spherical surface of the inner ring is deformed and there is a likelihood that the boundary part will rise outward in a radial direction from the outer spherical surface of the inner ring. When the risen portion of the inner ring interferes with a holder, noise may be generated or a relative operation of the inner ring with respect to the holder may be affected.

In Japanese Unexamined Patent Application Publication No. 8-42585 (JP 8-42585 A), it is described that a chamfered portion is provided between an inner-ring ball groove and an outer spherical surface of an inner ring in the inner ring for the purpose of curbing deformation of a boundary part between the inner-ring ball groove and the outer spherical surface of the inner ting. In a sectional shape perpendicular to an axis of the inner ring in the chamfered portion, a part of the chamfered portion close to the inner-ring ball groove is formed in a linear shape and a part of the chamfered portion close to the outer spherical surface is formed in a protruding arc shape.

SUMMARY

It is known that a contact shape between the inner-ring ball groove and a ball has an elliptical range. However, when a contact position of a ball is located in the vicinity of an edge of the inner-ring ball groove, a part of a contact ellipse of the ball may be missed. In the shape of the chamfered portion described in JP 8-42585 A, a boundary part between the inner-ring ball groove and a linear portion of the chamfered portion is formed in an edge shape. When a part of the contact ellipse of the ball is missed, the ball comes into contact with the edged part of the inner ring and a high pressure is applied to the ball from the edged part. Then, there is concern that the ball may be deformed and a deformed part of the ball may interfere with a holder, the inner-ring ball groove, and an outer-ring ball groove. As a result there is concern that noise may be generated or relative operations of the inner ring, the outer ring, the holder, and the ball may be affected.

The disclosure provides a constant-velocityconstant-velocity universal joint that can prevent a boundary part between an inner-ring ball groove and an outer spherical surface in an inner ring from being deformed to rise outward in a radial direction from the outer spherical surface and prevent a ball from being deformed due to a load applied from the inner ring.

According to an aspect of the disclosure, there is provided a constant-velocityconstant-velocity universal joint of a joint center fixed type. The constant-velocityconstant-velocity universal joint includes: an outer ring in which a plurality of outer-ring ball grooves extending in an axial direction is formed in an inner circumferential surface; an inner ring in which a plurality of inner-ring ball grooves extending in the axial direction is formed in an outer circumferential surface; a plurality of balls that engages with the outer-ring ball grooves and the Inner-ring ball grooves; and a holder that is interposed between an inner spherical surface of the outer ring and an outer spherical surface of the inner ring and in which a holding window for holding the plurality of balls is formed. A chamfered portion is formed in the inner ring between each of the inner-ring ball grooves and the outer spherical surface. The chamfered portion includes a linear section portion that is located in the chamfered portion close to the outer spherical surface and is formed in a linear shape in a section perpendicular to a moving locus of the center of the corresponding hall and an arc section portion that is located in the chamfered portion close to the corresponding inner-ring ball groove and is formed in a protruding arc shape in the section perpendicular to the moving locus of the center of the corresponding ball.

With this configuration by providing a chamfered portion between the corresponding inner-ring ball groove and the outer spherical surface in the inner ring of the constant-velocityconstant-velocity universal joint, it is possible to prevent the corresponding ball from being a deformed to rise outward in the radial direction from the outer spherical surface of the inner ring even when the inner-ring ball groove is deformed due to a load applied from the ball, Particularly, in the chamfered portion, the linear section portion is located continuous from the outer spherical surface and the arc section portion is located continuous from the inner-ring ball groove. In this way, the circumferential length of the chamfered portion can be set to be greater through the combination of the linear section portion and the are section portion of the chamfered portion. As a result, it is possible to further prevent the corresponding ball from being deformed to rise outward in the radial direction from the outer spherical surface of the inner ring even when the inner-ring ball groove is deformed due to a load applied from the ball. Accordingly, it is possible to prevent the rising part of the inner ring from interfering with the holder, to prevent generation of noise due to interference, and to curb a bad influence on relative operations of the inner ring and the holder.

In the chamfered portion, the arc section portion is located continuous from the corresponding inner-ring ball groove. When the inner-ring ball groove is slightly deformed in a state in which a contact ellipse of the inner-ring ball groove with a ball is missed, the are section portion of the chamfered portion comes into contact with the ball. By bringing the ball into contact with the arc section portion located continuous from the inner-ring ball groove of the chamfered portion when the inner-ring ball groove is slightly deformed, it is possible to decrease a pressure which is applied, to the ball from the inner ring. Accordingly, it is possible to curb deformation due to a load applied to the ball from the inner ring.

According to the aforementioned aspect, it is possible to provide a constant-velocity universal joint that can prevent a boundary part between an inner-ring ball groove and an outer spherical surface in an inner ring from being deformed to rise outward in a radial direction from the outer spherical surface and prevent a ball from being deformed due to a load applied from the inner ring.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

1. Basic Configuration of Constant-Velocity Universal Joint 1

Figure 1:
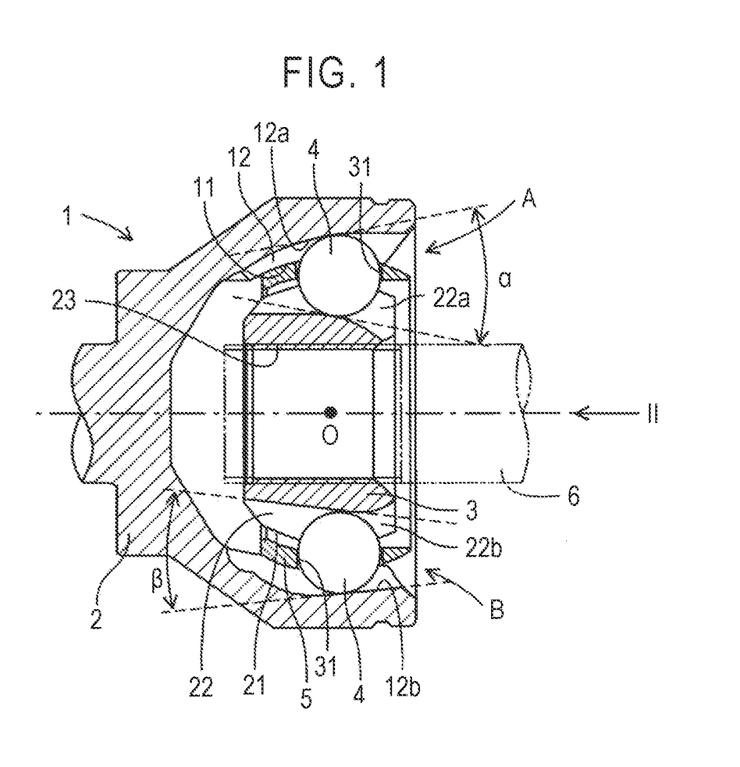
FIG. 1 is a sectional view in an axial direction of a constant-velocity universal joint.
Figure 2:
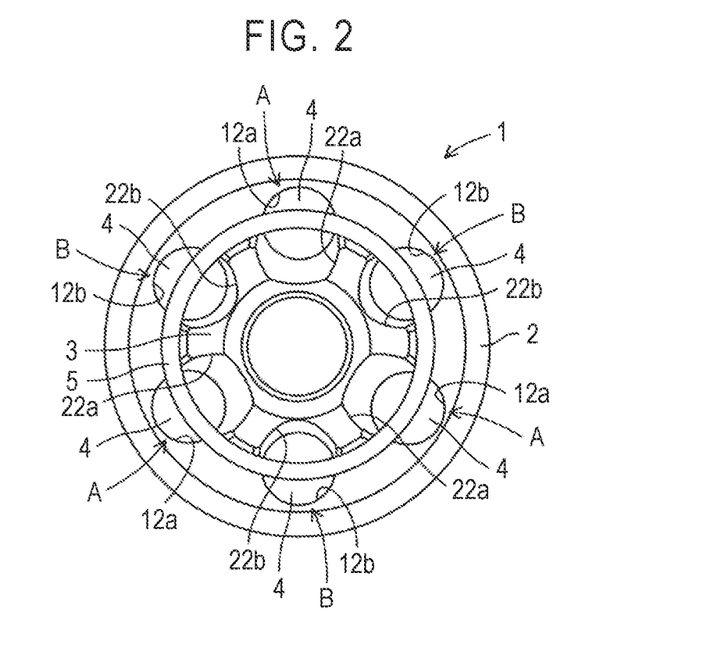
FIG. 2 is a view of the constant-velocity universal joint when seen from a cup opening side of an outer ring and a sectional view when seen in a direction of line II in FIG. 1.

A basic configuration of a constant-velocity universal joint 1 will be described below with reference to FIGS. 1 and 2. The constant-velocity universal joint 1 is used, for example, to transmit a driving force of a power source of a vehicle to wheels. The constant-velocity universal joint 1 according to an embodiment is of a joint center fixed type and is a joint using a ball 4 as a torque transmission member. The constant-velocity universal joint 1 includes an outer ring 2 an inner ring 3, a plurality of balls 4, and a holder 5.

The outer ring 2 is formed in a tubular shape. In this embodiment, the outer ring 2 is formed in a cup shape with a bottom. The outer ring 2 includes an inner spherical surface 11 centered on a joint center point O on an inner circumferential surface thereof. A plurality of outer-ring ball grooves 12 extending in an axial direction of the outer ring 2 is formed in the inner circumferential surface of the outer ring 2, In this embodiment, the plurality of outer-ring ball grooves 12 is formed at equal intervals in a circumferential direction of the outer ring 2. Each of the outer-ring ball grooves 12 is formed, for example, in a gothic-arc shape. A surface between neighboring outer-ring ball grooves 12 is formed of the inner spherical surface 11, In this embodiment, the outer ring 2 includes six outer-ring ball grooves 12 at equal intervals in the circumferential direction and six parts of the inner spherical surface 11.

The inner ring 3 is formed in a tubular shape and is disposed inside of the outer ring 2. The inner ring 3 includes an outer spherical surface 21 centered on the joint center point O on an outer circumferential surface thereof. A plurality of inner-ring ball grooves 22 extending in the axial direction of the inner ring 3 is formed in the outer circumferential surface of the inner ring 3. In this embodiment, the plurality of inner-ring ball grooves 22 is formed at equal intervals in the circumferential direction of the inner ring 3. Each of the inner-ring ball grooves 22 is formed, for example, in a gothic-arc shape. A surface between neighboring inner-ring ball grooves 22 is formed of the outer spherical surface 21. In this embodiment, the inner ring 3 includes six inner-ring ball grooves 22 at equal intervals in the circumferential direction and six parts of the outer spherical surface 21. The inner ring 3 has a spline 23 in the inner circumferential surface thereof and is fitted to a shaft 6.

The plurality of balls 4 is disposed between the corresponding outer-ring ball grooves 12 and the corresponding inner-ring ball grooves 22. Each ball 4 engages with the corresponding outer-ring ball groove 12 in a rotating direction of the outer ring 2 and engages with the corresponding inner-ring ball groove 22 in a rotating direction of the inner ring 3. Accordingly, the plurality of balls. 4 serves as a member that transmits a torque between the outer ring 2 and the inner ring 3. The balls 4 can move along the outer-ring ball grooves 12 and the inner-ring ball grooves 22. Each ball 4 is located at a position based on a join angle and a circumferential position of the outer ring 2 in an extending direction of the outer-ring ball grooves 12 and the inner-ring ball grooves 22. That is, with rotation of the constant-velocity universal joint t, each ball 4 reciprocates along the corresponding outer-ring ball groove 12 and the corresponding inner-ring ball groove 22.

The holder 5 is formed in a tubular shape and is interposed between the inner spherical surface 11 of the outer ring 2 and the outer spherical surface 21 of the inner ring 3. An outer circumferential surface of the holder 5 is formed in a shape of an outer spherical surface corresponding to the inner spherical surface 11 of the outer ring 2, and an inner circumferential surface of the holder 5 is formed in a shape of an inner spherical surface corresponding to the outer spherical surface 21 of the inner ring 3. A plurality of holding windows 31 for individually holding the corresponding balls 4 is formed in the holder 5. The plurality of holding windows 31 is formed at equal intervals in the circumferential direction of the holder 5.

2. Detailed Configuration of Constant-Velocity Universal Joint 1

A detailed configuration of the constant-velocity universal joint 1 will be described below with reference to FIGS. 1 and 2. In the constant-velocity universal joint 1 illustrated in FIGS. 1 and 2, it is assumed that outer-ring ball grooves 12a and 12b having different shapes are formed in the outer ring 2 and inner-ring ball grooves 22a and 22b having different shapes are formed in the inner ring 3, Here, the constant-velocity universal joint 1 may include the outer ring 2 in which all the outer-ring ball grooves 12 have the same shape and the inner ring 3 in which all the inner-ring ball grooves 22 have the same shape. That is, a bar field joint (BJ), an undercut free joint (UJ), or the like can be employed as the constant-velocity universal joint 1.

The outer ring 2 and the inner ring 3 in this embodiment will be described below in detail. The outer ring 2 includes a first outer-ring ball groove 12a and a second outer-ring ball groove 12b having different shapes. The first outer-ring ball groove 12a and the second outer-ring ball groove 12b are alternately arranged in the circumferential direction. The inner ring 3 includes a first inner-ring ball groove 22a and a second inner-ring ball groove 22b having different shapes. The first inner-ring ball groove 22a and the second inner-ring ball groove 22b are alternately arranged in the circumferential direction. The first outer-ring ball groove 12a and the first inner-ring ball groove 22a face each other in the radial direction, a ball 4 is disposed in an assembly A of the first outer-ring ball groove 12a and the first inner-ring ball groove 22a. The second outer-ring ball groove 1b and the second inner-ring ball groove 22b face each other in the radial direction, a ball 4 is disposed in an assembly B of the second outer-ring ball groove 12b and the second inner-ring ball groove 22b.

The assembly A of the first outer-ring ball groove 12a and the first inner-ring ball groove 22a is formed such that a nip angle α with a ball 4 interposed opens toward a cup opening (the right side in FIG. 1) of the outer ring 2 when a joint angle is a predetermined angle (for example, 0° in this embodiment). The assembly B of the second outer-ring ball groove 12b and the second inner-ring ball groove 22b is formed such that a nip angle β with a ball 4 interposed opens toward a cup bottom (the left side in FIG. 1) of the outer ring 2 when a joint angle is a predetermined angle (for example, 0° in this embodiment).

The ball 4 operates to push out the holder 5 in the direction in which the nip angle opens. The nip angle α between the first outer-ring ball groove 12a and the first inner-ring ball groove 22a and the nip angle β between the second outer-ring ball, groove 12b and the second inner-ring ball groove 22b open in opposite directions in the axial direction of the holder 5. With this configuration a force with which the ball 4 pushes out the holder 5 based on the nip angle α and a force with which the ball 4 pushes out the holder 5 based on the nip angle β act to cancel each other, and thus it is possible to reduce a load with which the holder 5 is pressed on the inner spherical surface 1 of the outer ring 2 and the outer spherical surface 21 of the inner ring 3. As a result, it is possible to reduce energy loss due to rolling of the balls 4 in the outer-ring ball grooves 12 and the inner-ring ball grooves 22.

3. Detailed Configuration of Inner Ring 3

Figure 3:
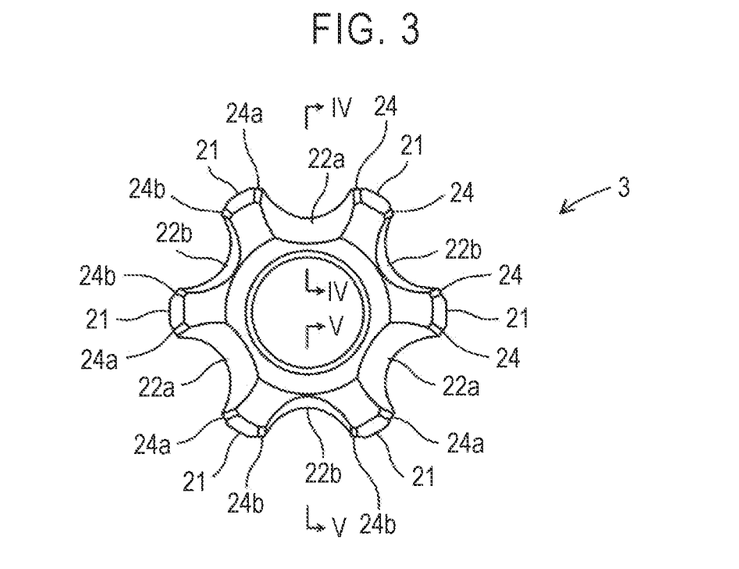
FIG. 3 is a view of an inner ring when seen in an axial direction.

A detailed configuration of the inner ring 3 will be described below with reference to FIGS. 3 to 5. As illustrated in FIG. 3, the first inner-ring ball groove 22a and the second inner-ring ball groove 22b are alternately formed in the circumferential direction of the inner ring 3. In the inner ring 3, a chamfered portion 24 is formed between the outer spherical surface 21 and each inner-ring ball groove 22. Specifically, a first chamfered portion 24a is formed between the outer spherical surface 21 and the first inner-ring ball groove 22a, and a second chamfered portion 24b is formed between the outer spherical surface 21 and the second inner-ring ball groove 22b.

Figure 4:
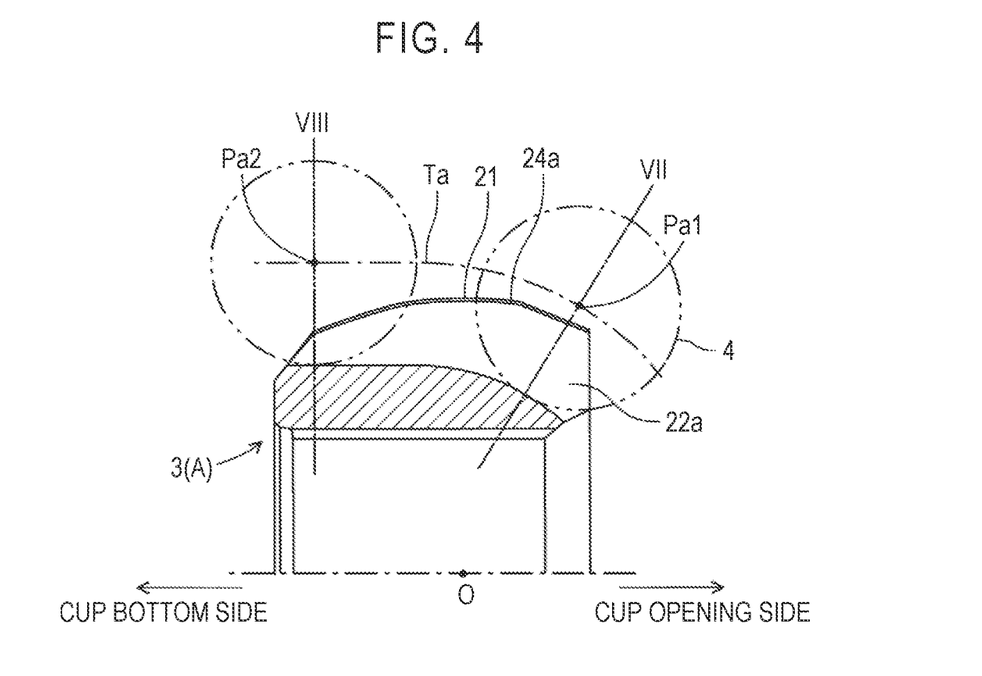
FIG. 4 is a sectional view in in the axial direction of a first inner-ring ball groove and a sectional view along line IV-IV in FIG. 3.

As illustrated in FIG. 4, the first chamfered portion 24a is formed at least in a range in which the first inner-ring ball groove 22a is in contact with the ball 4 in the axial direction of the inner ring 3. The first chamfered portion 24a ray be formed over the whole length in the axial direction of the inner ring 3.

A contact range between the ball 4 and the first inner-ring ball groove 22a at the time of transmission of a torque constitutes an elliptical shape at a position with an angle from the first inner-ring ball groove 22a. When the ball 4 rolls in the first inner-ring ball groove 22a, a moving locus Ta of the center of the ball 4 is as illustrated in FIG. 4. In this embodiment, the moving locus Ta of the center of the ball 4 includes a linear line parallel to the axis of the inner ring 3 on the cup bottom side and includes an arc shape on the cup opening side.

A groove depth of the first inner-ring ball groove 22a in a section perpendicular to the moving locus Ta of the center of the ball 4 becomes larger from the cup bottom side to the cup opening side of the outer ring 2, That is, when the center of the ball 4 is located at Pa1 in FIG. 4, the groove depth of the first inner-ring ball groove 22a is larger than when the center of the ball 4 is located at Pa2. An elliptical shape in which the ball 4 is in contact with the first inner-ring ball groove 22a is more likely to be partially missed as the groove depth of the first inner-ring ball groove 22a becomes smaller, That is, as the groove depth of the first inner-ring ball groove 22a becomes smaller, a contact area with the ball 4 becomes smaller and a pressure applied to the first inner-ring ball groove 22a from the ball 4 becomes larger.

Here, the groove depth of the first inner-ring ball groove 22a can be defined, for example, as follows. The groove depth of the first inner-ring ball groove 22a is defined as a distance between a groove bottom point of the first inner-ring ball groove 22a and an intersection at which a straight line extending outward in the radial direction of the inner ring 3 via the groove bottom point and a virtual surface of the outer spherical surface 21 of the inner ring 3 intersect each other in the section perpendicular to the moving locus Ta of the center of the ball 4. The virtual surface of the outer spherical surface 21 is a spherical surface of which the center is the center of the outer spherical surface 21 and of which the radius is the radius of the curvature of the outer spherical surface 21.

Figure 5:
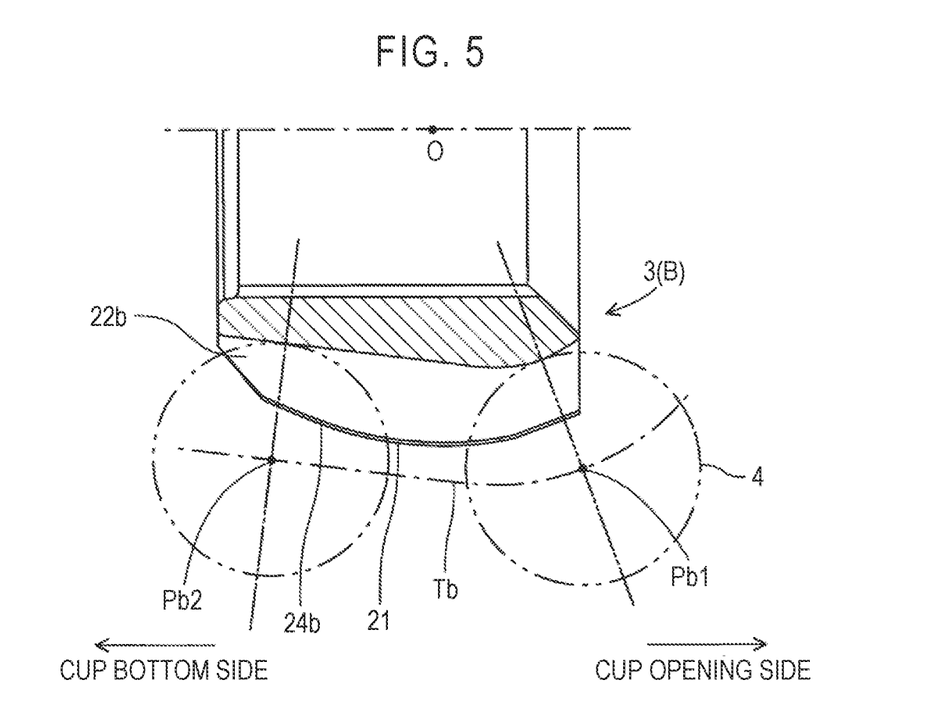
FIG. 5 is a sectional view in the axial direction of a second inner-ring ball groove and a sectional view along line V-V in FIG. 3.

As illustrated in FIG. 5, the second chamfered portion 24b is formed at least in a range in which the second inner-ring ball groove 22b is in contact with the ball 4 in the axial direction of the inner ring 3. The second chamfered portion 24b may be formed over the whole length in the axial direction of the inner ring 3.

A contact range between the ball 4 and the second inner-ring ball groove 22b at the time of transmission of a torque constitutes an elliptical shape at a position with an angle from the second inner-ring ball groove 22b. When the ball 4 rolls in the second inner-ring ball groove 22b, a moving locus Tb of the center of the ball 4 is as illustrated in FIG. 5. In this embodiment, the moving locus Tb of the center of the ball 4 includes a linear line having angle with respect to the axis of the inner ring 3 on the cup bottom side and includes an arc shape on the cup opening side.

A groove depth of the second inner-ring ball groove 22b in a section perpendicular to the moving locus Tb of the center of the ball 4 becomes slightly larger from the cup opening side to the cup bottom side of the outer ring 2. That is, when the center of the ball 4 is located at Pb1 in FIG. 5, the groove depth of the second inner-ring ball groove 22b is slightly smaller than when the center of the ball 4 is located at Pb2. An elliptical shape in which the ball 4 is in contact with the second inner-ring ball groove 22b is more likely to be partially missed as the groove depth of the second inner-ring ball groove 22b becomes smaller. That is, as the groove depth of the second inner-ring ball groove 22b becomes smaller, a contact area with the ball 4 becomes smaller and a pressure applied to the second inner-ring ball groove 22b from the ball 4 becomes larger. The groove depth of the second inner-ring ball groove 22b is defined in the same way as the groove depth of the first inner-ring ball groove 22a.

4. Configuration of First Chamfered Portion and Second Chamfered Portion

Figure 6:
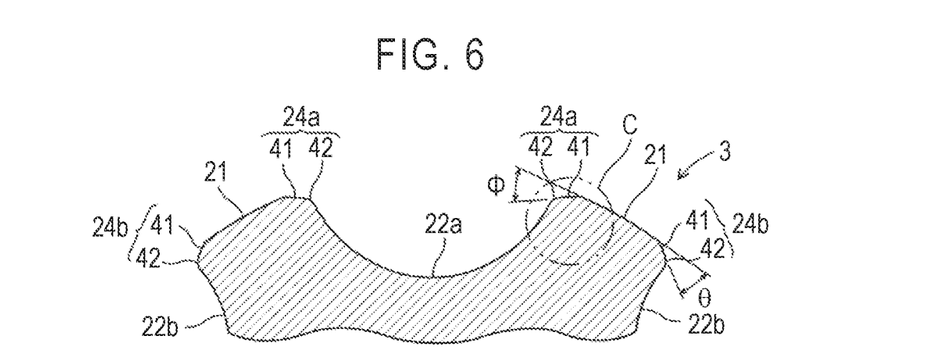
FIG. 6 is a partially enlarged sectional view in a direction perpendicular to an axis of an inner ring.

Configurations of the first chamfered portion 24a and the second chamfered portion 24b will be described below with reference to FIGS. 6 to 9. As illustrated in FIG. 6, the first chamfered, portion. 24a includes a linear section portion 41 and an arc section portion 42. Similarly to the first chamfered portion 24a, the second chamfered portion 24b includes a linear section portion 41 and an arc section portion 42.

As illustrated in FIG. 6, the linear section portion 41 of the first chamfered portion 24a is located in the vicinity of the outer spherical surface 21 in the first chamfered portion 24a, and is formed in a linear shape in the section perpendicular to the moving locus Ta of the center of the ball 4 (which is illustrated in FIG. 4). Particularly, the linear section portion 41 of the first chamfered portion 24a is formed continuous from the outer spherical surface 21 of the inner ring 3. The linear section portion 41 of the first chamfered portion 24a has an angle φ with respect to a tangential line at a position of the outer spherical surface 21 closest to the first chamfered portion 24a. The angle φ is set, for example, to be equal to or less than 45°.

Figure 7:
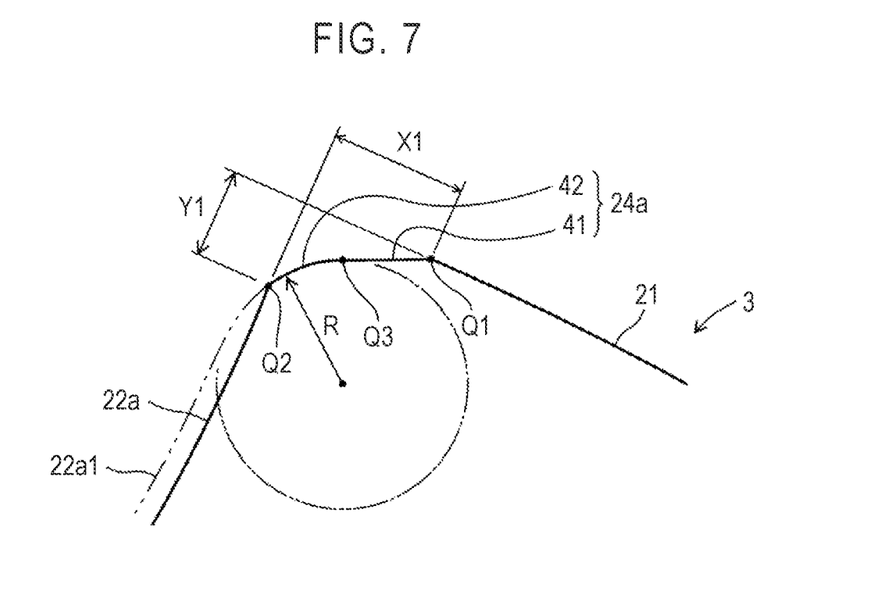
FIG. 7 is a sectional enlarged view corresponding to part C in FIG. 6 along, line VII in FIG. 4 at a position on a cup opening side in the first inner-ring ball groove.
Figure 8:
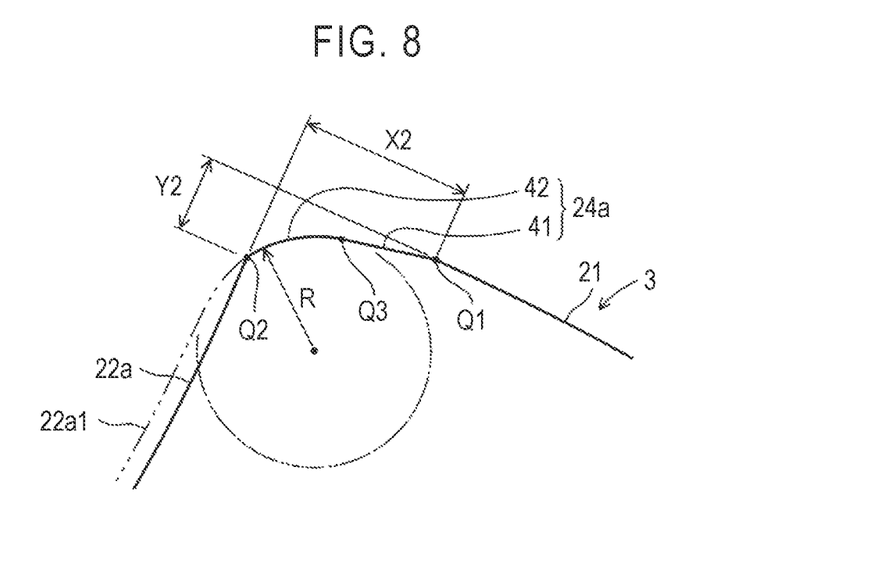
FIG. 8 is a sectional enlarged view corresponding to part C in FIG. 6 along line VIII in FIG. 4 at a position on a cup bottom side in the first inner-ring ball groove.

The are section portion 42 of the first chamfered portion 24a is located in the vicinity of the first inner-ring ball groove 22a in the first chamfered portion 24a, and is formed in a protruding are shape in the section perpendicular to the moving locus Ta of the center of the ball 4 (which is illustrated in FIG. 4). The radius of curvature of the arc section portion 42 of the first chamfered portion 24a is a radius R (which is illustrated in FIGS. 7 and 8). The are section portion 42 of the first chamfered portion 24a is formed in the vicinity of the linear section portion 41 and is formed in a shape in which it is smoothly and continuously connected to the linear section portion 41. That is, a boundary between the linear section portion 41 and the are section portion 42 of the first chamfered portion 24a includes a common tangential line. The arc section portion 42 of the first chamfered portion 24a is formed continuous from the first inner-ring ball groove 22a.

Regarding a manufacturing method, the inner ring 3 is molded by forging and then is subjected to cutting of the inner-ring ball grooves 22. Accordingly, in the inner ring 3, the outer spherical surface 21, the first chamfered portion 24a, and the second chamfered portion 24b are molded surfaces based on forging, and the first inner-ring ball groove 22a and the second inner-ring ball groove 22b are machined surfaces based on cutting.

Through forging of the inner ring 3, the arc section portion 42 of the first chamfered portion 24a is formed in a shape in which it is smoothly and continuously connected to the first inner-ring ball groove 22a before cutting is performed. Here, when the first inner-ring ball groove 22a is formed by cutting, the are section portion 42 of the first chamfered portion 24a includes a non-smooth angled part in a boundary part with the first inner-ring ball groove 22a after cutting has been performed.

The linear section portion 41 of the second chamfered portion 24b is located in the vicinity of the outer spherical surface 21 in the second chamfered portion 24b, and is formed in a linear shape in the section perpendicular to the moving locus Tb of the center of the ball 4 (which is illustrated in FIG. 5). Particularly, the linear section portion 41 of the second chamfered portion 24b is formed continuous from the outer spherical surface 21 of the inner ring 3. The linear section portion. 4.1 of the second chamfered portion 24b has an angle θ with respect to a tangential line at a position of the outer spherical surface 21 closest to the second chamfered portion 24b. The angle θ is set, for example, to be equal to or less than 45°.

The arc section portion 42 of the second chamfered portion 24b is located in the vicinity of the second inner-ring ball groove 22b in the second chamfered portion 24b, and is formed in a protruding are shape in the section perpendicular to the moving locus Tb of the center of the ball 4 (which is illustrated in FIG. 5). The radius of curvature of the arc section portion 42 of the second chamfered portion 24b is a radius R which is the same as the radius of curvature of the arc section portion 42 of the first chamfered portion 24a. The arc section portion 42 of the second chamfered portion 24b is formed in the vicinity of the linear section portion 41 and is formed in a shape in which it is smoothly and continuously connected to the linear section portion 41. That is, a boundary between the linear section portion 41 and the arc section portion 42 of the second chamfered portion 24b includes a common tangential line. The arc section portion 42 of the second chamfered portion 24b is formed continuous from the second inner-ring ball groove 22b.

Through forging of the inner ring 3, the are section portion 42 of the second chamfered portion 24b is formed in a shape in which it is smoothly and continuously connected to the second inner-ring ball groove 22'b before cutting is performed, Here, when the second inner-ring ball groove 22b is formed by cutting, the arc section portion 42 of the second chamfered portion 24b includes a now-smooth angled part in a boundary part with the second inner-ring ball groove 22b after cutting has been performed.

At a position on the cup opening side of the outer ring 2, as illustrated in FIG. 7, the first chamfered portion 24a has a circumferential length X1 and a radial length Y1. The circumferential length X1 is defined as a distance between a normal line, which passes through a boundary point Q1 between the outer spherical surface 21 and the first chamfered portion 24a, at a position of the outer spherical surface 21 closest to the first chamfered portion 24a and a line passing through a boundary point Q2 between the first inner-ring ball groove 22a and the first chamfered portion. 24a and parallel to the normal line. The radial length Y1 is defined as a distance between a tangential line, which passes through the boundary point Q1, at a position of the outer spherical surface 21 closest to the first chamfered portion 24a and a line passing through the boundary point Q2 and parallel to the tangential line.

At a position on the cup opening side of the outer ring 2, as illustrated in FIG. 7, the circumferential length X1 of the first chamfered portion 24a is set to be larger than the radial length Y1 of the first chamfered portion 24a. In the first chamfered portion 24a, a boundary point Q3 between the linear section portion 41 and the arc section portion 42 is located in the vicinity of the center of the first chamfered portion 24a. In FIG. 7, a first inner-ring ball groove 22a1 indicated by a two-dot chain line has a shape of the first inner-ring ball groove 22a molded by forging before cutting is performed thereon.

At a position on the cup bottom side of the outer ring 2, as illustrated in FIG. 8, the first chamfered portion 24a has a circumferential length X2 and a radial length Y2. The circumferential length X2 and the radial length Y2 are defined in the same way as the circumferential length X1 and the radial length Y1. At a position on the cup bottom side of the outer ring 2, as illustrated in FIG. 8, the circumferential length X2 of the first chamfered portion 24a is set to be larger than the radial length Y2 of the first chamfered portion 24a. In the first chamfered portion 24a, a boundary point Q3 between the linear section portion 41 and the arc section portion 42 is located in the vicinity of the center of the first chamfered portion 24a.

As illustrated in FIGS. 7 and 8, the first chamfered portion 24a is formed in a shape varying depending on an axial position of the inner ring 3. As illustrated in FIGS. 7 and 8, the radius of curvature R of the arc section, portion 42 of the first chamfered portion 24a is set to be constant regardless of the axial position of the inner ring 3. In molding by forging, the radius of curvature R has molding unevenness of about ±0% depending on the axial position. In the aforementioned description, "setting to be constant" includes molding unevenness, Even if molding unevenness occurs, operational advantages which will be described later are satisfactorily achieved.

Figure 9:
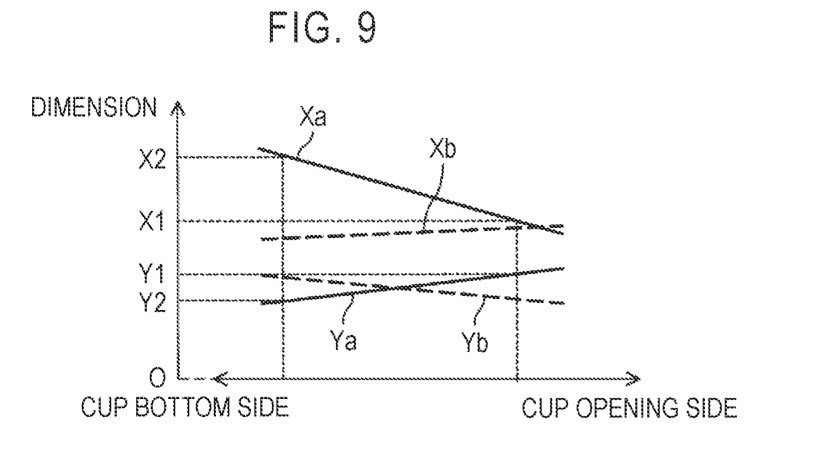
FIG. 9 is a graph illustrating a relationship between circumferential lengths Xa and Xb of chamfered portions and radial lengths Ya and Yb of the chamfered portions in the axial direction of the chamfered portions.

A circumferential length Xa and a radial length Ya over the whole length of the first chamfered portion 24a will be described below with reference to FIG. 9. As illustrated in FIG. 9, the circumferential length Xa and the radial length Ya of the first chamfered portion 24a are set to vary depending on an axial position of the inner ring 3. Specifically, the circumferential length Xa of the first chamfered portion 24a varies to become smaller from the cup bottom side to the cup opening side of the outer ring 2. In other words, the circumferential length Xa of the first chamfered portion 24a is set to be smaller at a position at which the groove depth of the first inner-ring ball groove 22a is larger in the section perpendicular to the moving locus Ta of the center of the ball 4 (which is illustrated in FIG. 4) than at a position at which the groove depth is smaller in the axial direction of the inner ring 3, In other words, the circumferential length Xa of the first chamfered portion 24a is set to be larger at a position on a base side (the cup bottom side) in a direction in which the nip angle α (which is illustrated in FIG. 1) opens and to be smaller at a position on a tip side (the cup opening side) in the direction in which the nip angle α is open.

The radial length Ya of the first chamfered portion 24a varies to become larger from the cup bottom side to the cup opening side of the outer ring 2. In other words, the radial length Ya of the first chamfered portion 24a is set to be larger at a position at which the groove depth of the first inner-ring ball groove 22a is larger in the section perpendicular to the moving locus Ta of the center of the ball 4 (which is illustrated in FIG. 4) than at a position at which the groove depth is smaller in the axial direction of the inner ring 3. In other words, the radial length Ya of the first chamfered portion 24a is set to be smaller on the base side (the cup bottom side) in the direction in which the nip angle α (which illustrated in FIG. 1) opens and to be larger at a position on the tip side (the cup opening side) in the direction in which the nip angle α is open.

As illustrated in FIG. 9, the circumferential length Xa of the first chamfered portion 24a is normally larger than the radial length Ya. A difference between the circumferential length Xa and the radial length Ya becomes larger to the cup bottom side of the outer ring 2 and becomes smaller to the cup opening side.

On the other hand, similarly to the first chamfered portion 24a, the second chamfered portion 24b is formed in a shape varying depending on an axial position of the inner ring 3. The radius of curvature R of the arc section portion 42 of the second chamfered portion 24b is set to be constant regardless of the axial position of the inner ring 3. As described above, molding unevenness occurs in molding by forging. Here "setting to be constant" also includes molding unevenness, Even if molding unevenness occurs, operational advantages which will be described later are satisfactorily achieved.

As illustrated in FIG. 9, the circumferential length Xb and the radial length Yb of the second chamfered portion 24b are set to vary depending on an axial position of the inner ring 3. Specifically, the circumferential length Xb of the second chamfered portion 24b varies to become smaller from the cup opening side to the cup bottom side of the outer ring 2. In other words, the circumferential length Xb of the second chamfered portion 24b is set to be smaller at a position at which the groove depth of the second inner-ring ball groove 22b is larger in the section perpendicular to the moving locus Tb of the center of the ball 4 (which is illustrated in FIG. 5) than at a position at which the groove depth is smaller in the axial direction of the inner ring Y In other words, the circumferential length Xb of the second chamfered portion 24b is set to be larger at a position on the base side (the cup opening side) in the direction in which the nip angle β (which is illustrated in FIG. 1) opens and to be smaller at a position on the tip side (the cup bottom side) in the direction in which the nip angle is open.

The radial length Yb of the second chamfered portion. 24b varies to become larger from the cup opening side to the cup bottom side of the outer ring 2. In other words, the radial length Yb of the second chamfered portion 24b is set to be larger at a position at which the groove depth of the second inner-ring ball groove 22b is larger in the section perpendicular to the moving locus Tb of the center of the ball 4 (which is illustrated in FIG. 5) than at a position at which the groove depth is smaller in the axial direction of the inner ring 3. In other words, the radial length Yb of the second chamfered portion 24b is set to be smaller on the base side (the cup opening side) in the direction in which the nip angle β (which illustrated in FIG. 1) opens and to be larger at a position on the tip side (the cup bottom side) in the direction in which the nip angle β is open.

5. Advantages

With the constant-velocity universal joint 1 according to the aforementioned embodiment, the following advantages can be obtained. By providing a chamfered portion 24 between a corresponding inner-ring ball groove 22 and an outer spherical surface 21 in the inner ring 3 of the constant-velocity universal joint 1, it is possible to prevent the corresponding ball 4 from being deformed to rise outward in the radial direction from the outer spherical surface 21 of the inner ring even when the inner-ring ball groove 22 is deformed due to a load applied from the ball 4. Particularly, in the chamfered portion 24, a linear section portion 41 is located continuous from the outer spherical surface 21 and an arc section portion 42 is located continuous from the inner-ring ball groove 22. In this way, the circumferential lengths Xa and Xb of the chamfered portion 24 can be set to be greater in combination of the linear section portion 41 and the arc section portion 42 of the chamfered portion 24, As a result, it is possible to further prevent the corresponding ball 4 from beam deformed to rise outward in the radial direction from the outer spherical surface 21 of the inner ring 3 even when the inner-ring ball groove 22 is deformed due to a load applied from the corresponding ball 4. Accordingly, it is possible to prevent the rising part of the inner ring 3 front interfering with the holder 5, to prevent generation of noise due to interference, and to curb a bad influence on relative operations of the inner ring 3 and the holder 5.

In the chamfered portion 24, the arc section portion 42 is located continuous from the corresponding inner-ring ball, groove 22. When the inner-ring ball groove 22 is slightly deformed in a state in which a contact ellipse of the inner-ring ball groove 22 with a ball 4 is missed, the arc section portion 42 of the chamfered portion. 24 comes into contact with the ball 4. By bringing the ball 4 into contact with the arc section portion 42 located continuous from the inner-ring ball groove 22 of the chamfered portion. 24 when the inner-ring ball roove 22 is slightly deformed, it is possible to decrease a pressure which is applied to the ball 4 from the inner ring 3. Accordingly, it is possible to curl) deformation due to a load applied to the ball 4 from the inner ring 3.

Accordingly, it is possible to prevent a boundary part between the inner-ring ball groove 22 and the outer spherical surface 21 in the inner ring 3 from being deformed to rise outward in the radial direction from the outer spherical surface 21 and to prevent the ball 4 from being deformed due to a load applied to the ball 4 from the inner ring 3.

In the chamfered portion 24, the linear section portion 41 is formed continuous from the outer spherical surface 21 of the inner ring 3, and the arc section portion 42 is formed continuous from the linear section portion 41. The arc section portion. 42 is smoothly and continuously connected to the linear section portion 41, Accordingly, it is possible to form a desired shape of a chamfered portion 24.

The circumferential lengths Xa and Xb of the chamfered portions 24a and 24b are set to be larger than the radial lengths Ya and Yb of the chamfered portions 24a and 24b. By applying such a length relationship to the chamfered portions 24a and 24b, it is possible to reliably realize the aforementioned advantages.

The circumferential lengths Xa and X of the chamfered portions 24a and 24b are set to vary depending on the axial position of the inner ring 3. The radial lengths Ya and Yb of the chamfered portions 24a and 241 are set to vary depending on the axial position of the inner ring 3. By forming the chamfered portions 24a and 24b in shapes corresponding to the inner-ring ball grooves 22a and 22b, it is possible to form the chamfered portions 24a and 24b to shapes which are suitable for exhibiting the aforementioned advantages.

For example, the circumferential lengths Xa and Xb of the chamfered portions 24a and 24b are set to be smaller at a position at which the groove depth of the inner-ring ball grooves 22a and 22b is larger in the sections perpendicular to the moving loci Ta and Tb of the centers of the balls 4 than at a position at which the groove depth is smaller in the axial direction of the inner ring 3. The radial lengths Ya and Yb of the chamfered portions 24a and 24b are set to be larger at a position at which the groove depth of the inner-ring ball grooves 22a and 22b is larger in the sections perpendicular to the moving loci Ta and Tb of the centers of the balls 4 than at a position at which the groove depth is smaller in the axial direction of the inner ring 3. By forming the chamfered portions 24a and 24b in shapes varying depending on the groove depth of the inner-ring ball grooves 22a and 22b, it is possible to exhibit the aforementioned advantages.

The radius of curvature R of the are section portions 42 of the chamfered portions 24a and 24b is set to be constant regardless of the axial position of the inner ring 3. When the inner-ring ball grooves 22a and 22b are slightly deformed in a state in which the contact ellipses of the inner-ring ball grooves 22a and 22b with the balls 4 are partially missed, the balls 4 come into contact with the arc section portions 42 of the chamfered portions 24a and 24b. By setting the radius of curvature R of the arc section portion 42 to be constant, the balls 4 come into contact with the arc section portions 42 of which the radius of curvature is set to be constant when the inner-ring ball grooves 22a and 22b are slightly deformed, and thus the pressure applied to the balls 4 from the inner ring 3 can be set to a desired range of small values. Accordingly, even when the balls 4 are located at any position of the inner-ring ball grooves 22a and 22b, it is possible to prevent the balls 4 from being deformed due to a load applied from the inner ring 3.

In the aforementioned embodiment, the constant-velocity universal joint 1 includes two different outer-ring ball grooves 12a and 12b and includes two different inner-ring ball grooves 22a and 22b. The radial lengths Ya and Yb of the chamfered portions 24a and 24b are set to vary depending on the axial position of the inner ring 3. The radial lengths Ya and Yb of the chamfered portions 24a and 24b are set to be smaller at a position on the base side in the directions in which the nip angles α and β open and to be larger at a position on the tip side in the directions in which the nip angles α and β are open. The circumferential lengths Xa and Xb of the chamfered portions 24a and 24b are set to vary depending on the axial position of the inner ring 3. The circumferential lengths Xa and Xb of the chamfered portions 24a and 24b are set to be larger at a position on the base side in the directions in which the nip angles α and β open and to be smaller at a position on the tip side in the directions in which the nip angles α and β are open. When the constant-velocity universal joint 1 employs this configuration, it is possible to form the chamfered portions 24a and 24b in a desired shape and to exhibit the aforementioned advantages.

In the aforementioned embodiment, the first inner-ring ball groove 22a and the second inner-ring ball groove 22b of the inner ring 3 are molded by forging and then are machined b cutting, but cutting may be replaced with grinding or cutting may be performed after molding by forging and then grinding may be additionally performed.

What is claimed is:

1. A constant-velocity universal joint of a joint center fixed type, the constant-velocity universal Joint comprising:
   an outer ring in which a plurality of outer-ring ball grooves extending in an axial direction is formed in an inner circumferential surface;
   an inner ring in which a plurality of inner-ring ball grooves extending in the axial direction is formed in an outer circumferential surface;
   a plurality of balls that engages with the outer-ring ball grooves and the inner-ring ball grooves; and
   a holder that is interposed between an inner spherical surface of the outer ring and an outer spherical surface of the inner ring and in which a holding window for holding the plurality of balls is formed,
   wherein the plurality of inner-ring ball grooves includes a first inner-ring ball groove and a second inner-ring ball roove having different shapes,
   wherein a chamfered portion is formed in the inner ring between each of the inner-ring ball grooves and the outer spherical surface, and
   wherein the chamfered portion includes a linear section portion and an arc section portion, the linear section portion is located in the chamfered portion close to the outer spherical surface and is formed in a linear shape in a section perpendicular to a moving locus of a center of the corresponding ball, and the arc section portion is located in the chamfered portion close to the corresponding: inner-ring ball groove and is formed in a protruding arc shape in the section perpendicular to the moving locus of the center of the corresponding ball.

2. The constant-velocity universal joint according to claim 1, wherein the linear section portion is formed continuous from the outer spherical surface of the inner ring, and wherein the arc section portion is formed continuous from the linear section portion and continuous from the corresponding inner-ring ball groove.

3. The constant-velocity universal joint according to claim 1, wherein the arc section portion is smoothly and continuously connected to the linear section portion.

4. The constant-velocity universal joint according to claim 1, wherein a circumferential length of the chamfered portion is set to be larger than a radial length of the chamfered portion.

5. The constant-velocity universal joint according to claim 1, wherein a circumferential length of the chamfered portion is set to vary depending on an axial position of the inner ring.

6. The constant-velocity universal joint according to claim 5, wherein the circumferential length of the chamfered portion is set to be less at a position at which a groove depth of the corresponding inner-ring ball groove is larger in the section perpendicular to the moving locus of the center of the corresponding ball than at a position at which the groove depth of the inner-ring ball groove is smaller in the axial direction of the inner ring.

7. The constant-velocity universal joint according to claim 5, wherein a radial length of the chamfered portion is set to vary depending on an axial position of the inner ring.

8. The constant-velocity universal joint according to claim 7, wherein the radial length of the chamfered portion is set to be greater at the position at which a groove depth of the corresponding inner-ring ball groove is larger in the section perpendicular to the moving locus of the center of the corresponding ball than at the position at which the groove depth of the inner-ring ball groove is smaller in the axial direction of the inner ring.

9. The constant-velocity universal joint according to claim 5, wherein a radius of curvature of the arc section portion is set to be constant regardless of the axial position of the inner ring.

10. The constant-velocity universal joint according to claim 1, wherein the outer ring is Formed in a cup shape with a bottom, wherein the outer-ring ball grooves and the inner-ring ball grooves include a first outer-ring ball groove and the first inter-ring ball groove that are formed such that a nip angle with the corresponding ball interposed opens toward a cup opening of the outer ring when a joint angle is a predetermined angle, and a second outer-ring ball groove and j second inner-ring ball groove that are formed such that the nip angle with the corresponding ball interposed opens toward a cup bottom of the outer ring when the joint angle is the predetermined angle, and wherein a radial lengths of the chamfered portions close to the first inner-ring ball groove and the second inner-ring ball groove are set to vary depending on an axial position of the inner ring, to be less at a position on a base side in the direction in which the nip angle opens, and to be greater than at a position on a tip side in the direction in which the nip angle opens.

11. The constant-velocity universal joint according to claim 10, wherein a circumferential length of the chamfered portion close to the corresponding first inner-ring ball groove is set to vary depending on the axial position of the inner ring, to be greater at a position on the base side in the direction in which the nip angle opens, and to be less at a position on the tip side in the direction in which the nip angle opens.

* * * * *